Figure 1:
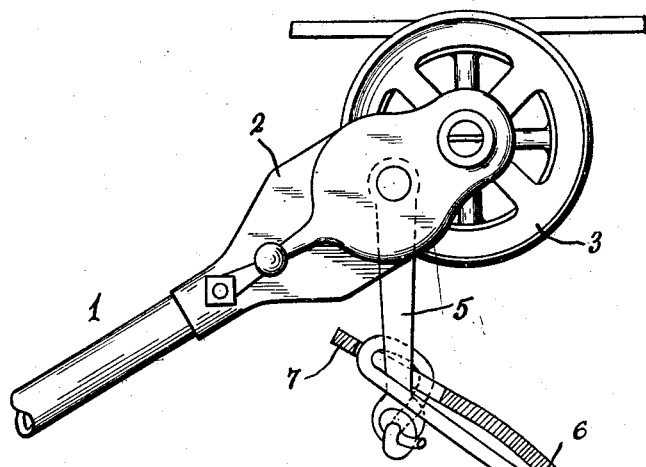

Dec. 22, 1931.   H. HOLLAND   1,837,436
PRESSURE EQUALIZING DEVICE FOR TROLLEY POLES

Filed Feb. 6, 1931

INVENTOR.
Henry Holland
BY
Ray Oberlin & Ray
ATTORNEYS.

Patented Dec. 22, 1931

1,837,436

UNITED STATES PATENT OFFICE

HENRY HOLLAND, OF CLEVELAND, OHIO

PRESSURE EQUALIZING DEVICE FOR TROLLEY POLES

Application filed February 6, 1931. Serial No. 513,855.

This invention, as indicated, relates to a pressure equalizing device for trolley current collectors. More particularly it comprises an attachment adapted to be applied directly to the trolley device or to the retracting cord at a position closely adjacent to the trolley wire so as to be acted upon by the air currents set up when a trolley car travels at high speed. Also, this device serves as a guide or guard.

It is the usual practice in installing trolleys to carry a sufficient pressure on the main spring of a trolley to insure the trolley wheel, trolley shoe, or other current collector having adequate contact with the current conducting wire at every degree of speed. This requires that somewhat more spring tension is used for the lower speeds than is necessary to make suitable contact, and, if the trolley leaves the wire, damage to overhead may occur as well as excessive work for the retriever.

The present invention has in view the use of moderate spring tension for the trolley device proper so that a satisfactory and scientifically predetermined trolley pressure upon the wire is maintained at all average speeds and, as the trolley car is speeded up, additional pressure to compensate for the wind resistance is automatically applied. This is accomplished by providing wings or vanes to be acted upon by horizontal air currents on the under side and to force the trolley wheel with increasing pressure in an upward direction.

The principal object of the present invention is to provide a pressure equalizing device which may be applied to a trolley pole or its appurtenances at a point closely adjacent the trolley contact device or current collector, so as to counteract the tendency of the trolley to be forced downwardly as it encounters high wind resistance. Another object of the invention is to provide a device which may be readily applied to a trolley pole to force the trolley wheel into suitable contact with the trolley wire at high speeds when wind resistance is encountered and to have such device automatic in its action so as to proportion the upward pressure directly to the rate of speed and thus to compensate and maintain substantially uniform pressure on the trolley device at all rates of speed and to cause uniform, noiseless travel of the current collector.

Another object of the invention is to provide a pressure equalizing device which may be readily detached from any trolley pole and applied to any other trolley pole and which will be of such construction that it will not accumulate ice and sleet thus disturbing the regular adjusted pressures provided for the trolley pole. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 2:
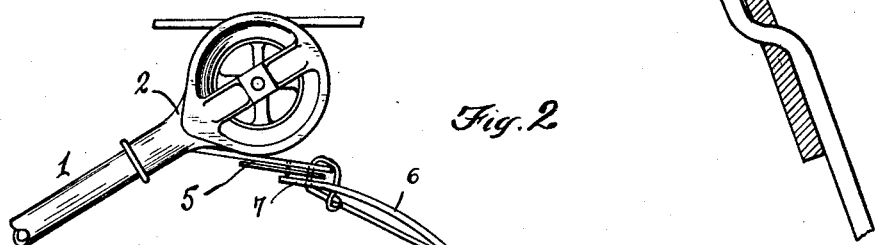
Figure 3:
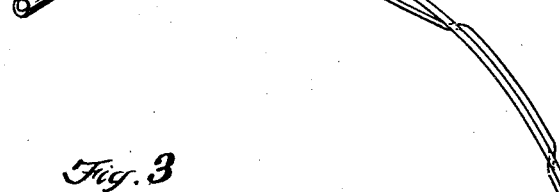

In said annexed drawings:

Fig. 1 is a side elevation showing a trolley harp and trolley wheel, together with a retracting cord connector to which is applied a device embodying the principles of my invention; Fig. 2 is a view similar to Fig. 1, showing the device applied to a modified form of pivoted fastener, as seen when in high speed operation; and Fig. 3 is a plan view showing the construction of the equalizing device.

As is clearly shown in the drawings, in the preferred form of construction, the trolley pole 1 carrying at its upper end the trolley harp 2 with the trolley wheel 3 engaged therein, is provided with the usual retracting rope 4 attached by means of a pivoted fastener 5. The rope is also used as the means for attaching the equalizing device which, as is clearly shown in the drawing, comprises a vane 6 preferably made of flexible sheet material such as leather or rubber, and of tapered or pear-shape, with an extension or tab 7 at its upper end formed with an elongated slot 9, through which the standard trolley rope may be engaged and looped through the attaching clip and tied at a point beneath the slot to the main portion of the rope, so that it cannot become accidentally disengaged. The trolley rope is preferably threaded through the equalizing device which is formed with a pair of intermediate holes 9, 10, and with a terminal hole 11 adjacent its lower end. The trolley rope then extends downwardly to the usual retriever (not shown).

The body of the equalizing device is preferably formed of a combination of fabric and rubber, but obviously may be formed of any material of suitable character and shape to accomplish the purposes set forth. Thus, leather may be used, or any like material preferably treated to withstand weather. By using a composition of rubber and fabric and treating the same to prevent the adherence of moisture including ice and sleet, no disadvantages of any character attach through the use of the device.

Because of the flexible character of the equalizing element, any ice or snow which may become accidentally lodged upon the upper surface of the device is immediately detached from any adherence thereto through the flexing of the structure which will break away and dislodge any foreign substance of such character.

Obviously various forms of vanes as well as various points of attachment therefor may be utilized, but it has been found that by applying the device adjacent the point of attachment of the trolley retrieving means that great simplicity of construction and ready application of the device to any desired trolley may be had with a minimum of effort.

In addition to serving as a pressure equalizing device, the vane will also be found to act as a guard to prevent the trolley wheel catching in the overhead wire equipment when the trolley pole is drawn downwardly. It will be noted that in such case the pear-shaped outline of the vane will act as a guide to throw the trolley wheel in spaced relation to the adjacent wire or wires and thus permit the free passage of the flanges thereof out of contact with the wires.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A pressure equalizing device for trolley poles comprising a vane formed of flexible material, and having means for attaching the same adjacent the upper end of a trolley pole.

2. A combined guard and pressure equalizing device for trolley poles comprising a vane of tapered outline formed of flexible material, and having means for attaching the same adjacent the upper end of a trolley pole.

3. A pressure equalizing device for trolley poles comprising a vane formed of flexible material, and having means for attaching the same adjacent the upper end of a trolley pole, said means including a series of apertures through which the standard trolley retracting cord may be threaded.

4. A pressure equalizing device for trolley poles comprising a vane formed of flexible material of greater length than width and adapted to be held in a position extending downwardly from the horizontal when associated with the upper end of a trolley pole in order to permit free action of horizontal air currents against the under side of said vane to compensate for wind resistance against the trolley pole and the retaining cord.

5. An article of the character described having in combination a trolley pole, a harp attached to the upper end thereof and carrying a current collector, a connecting element for applying a trolley retracting rope to said structure at the upper end of the trolley pole, a clip for engaging said element, a rope adapted to be engaged with said clip, an elongated vane of flexible material provided with suitable apertures, said trolley rope being engaged in threaded relation through said apertures and connected with said clip and forming a combined vane-supporting means and trolley retracting device.

6. A combined trolley-retrieving and pressure-equalizing device adapted to be positioned adjacent the upper end of a trolley pole, said device comprising a sheet of flexible material of substantially pear-shaped outline with an end extension at a narrow portion thereof, and means for attaching said member to the trolley pole and the trolley rope.

7. A pressure-equalizing device for trolley structures comprising a vane formed of flat flexible material adapted to be downwardly flexed, means adjacent one end of said vane for attaching the same adjacent the upper end of a trolley pole, and means adjacent the other end of the same for connecting a trolley rope thereto.

Signed by me this 22nd day of December, 1930.

HENRY HOLLAND.